(12) United States Patent
Malladi

(10) Patent No.: US 8,520,607 B2
(45) Date of Patent: Aug. 27, 2013

(54) HOPPING STRUCTURE FOR CONTROL CHANNELS

(75) Inventor: Durga Prasad Malladi, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 840 days.

(21) Appl. No.: 12/015,422

(22) Filed: Jan. 16, 2008

(65) Prior Publication Data

US 2008/0198902 A1    Aug. 21, 2008

Related U.S. Application Data

(60) Provisional application No. 60/885,393, filed on Jan. 17, 2007, provisional application No. 60/888,459, filed on Feb. 6, 2007.

(51) Int. Cl.
*H04W 4/00* (2009.01)

(52) U.S. Cl.
USPC ............................ 370/329; 370/343; 370/480

(58) Field of Classification Search
None
See application file for complete search history.

(56) References Cited

U.S. PATENT DOCUMENTS

| | | | |
|---|---|---|---|
| 6,490,314 B1 * | 12/2002 | Khayrallah et al. | 375/132 |
| 2006/0121911 A1 * | 6/2006 | Zhang et al. | 455/452.2 |
| 2006/0133262 A1 | 6/2006 | Sutivong et al. | |
| 2006/0215603 A1 * | 9/2006 | Nishio et al. | 370/329 |
| 2006/0223449 A1 | 10/2006 | Sampath et al. | |

FOREIGN PATENT DOCUMENTS

| | | |
|---|---|---|
| EP | 1277289 A1 | 1/2003 |
| EP | 1892987 A1 | 2/2008 |
| RU | 2199820 C2 | 2/2003 |
| WO | WO9959263 | 11/1999 |
| WO | 0178247 | 10/2001 |
| WO | WO 0178247 A1 * | 10/2001 |
| WO | 2006134946 A1 | 12/2006 |

OTHER PUBLICATIONS

International Search Report—PCT/US08/051371—International Search Authority—European Patent Office—Jun. 27, 2008.
Written Opinion—PCT/US08/051371—International Search Authority—European Patent Office, Munich—Jun. 27, 2008.
Ericsson: "Frequency Hopping for E-UTRA Uplink." TSG RAN WG1 #46 BIS, vol. R1-062851, Oct. 9, 2006, pp. 1-2. XP002483658.
Motorola: "E-UTRA Uplink Control Signalling + TP." TAG RAN WG1 #44 BIS, vol. R1-060882, Mar. 26, 2006, pp. 1-8. XP002483659.
Taiwan Search Report—TW097101842—TIPO—Jun. 8, 2011.

* cited by examiner

*Primary Examiner* — Jae Y Lee
*Assistant Examiner* — Tito Pham
(74) *Attorney, Agent, or Firm* — Kam T. Tam

(57) ABSTRACT

Systems and methodologies are described that facilitate transmitting and receiving control data according to hopping patterns where the hopping patterns are defined based in part on bandwidth capabilities of a device transmitting the control data and bandwidth of the network on which the data is being transmitted. In this regard, devices having lower bandwidth capabilities than the network can hop within given frequency blocks reserved for control data assuming the blocks are no greater than the bandwidth of the device. Devices having greater or substantially equal bandwidth capabilities as the network can hop across disparate frequency blocks of the network reserved for control data as the device can handle substantially any hop in frequency. This preserves frequency diversity for control channels in multiple device types regardless of device bandwidth capabilities.

44 Claims, 12 Drawing Sheets

HOPPING STRUCTURE FOR CONTROL CHANNELS

CROSS-REFERENCE TO RELATED APPLICATIONS

This application claims the benefit of U.S. Provisional Patent application Ser. No. 60/885,393 entitled "A METHOD AND APPARATUS FOR ACK HOPPING FOR INTERFERENCE RANDOMIZATION IN UL SINGLE CARRIER FDMA" which was filed Jan. 17, 2007, and U.S. Provisional Patent application Ser. No. 60/888,459 entitled "A METHOD AND APPARATUS FOR ACK HOPPING FOR INTERFERENCE RANDOMIZATION IN UL SINGLE CARRIER FDMA" which was filed Feb. 6, 2007. The entireties of the aforementioned applications are herein incorporated by reference.

BACKGROUND

I. Field

The following description relates generally to wireless communications, and more particularly to frequency hopping for control channels.

II. Background

Wireless communication systems are widely deployed to provide various types of communication content such as, for example, voice, data, and so on. Typical wireless communication systems may be multiple-access systems capable of supporting communication with multiple users by sharing available system resources (e.g., bandwidth, transmit power, . . . ). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP long term evolution (LTE), etc.

Generally, wireless multiple-access communication systems may simultaneously support communication for multiple mobile devices. Each mobile device may communicate with one or more base stations via transmissions on forward and reverse links. The forward link (or downlink) refers to the communication link from base stations to mobile devices, and the reverse link (or uplink) refers to the communication link from mobile devices to base stations. Further, communications between mobile devices and base stations may be established via single-input single-output (SISO) systems, multiple-input single-output (MISO) systems, multiple-input multiple-output (MIMO) systems, and so forth. In addition, mobile devices can communicate with other mobile devices (and/or base stations with other base stations) in peer-to-peer wireless network configurations.

MIMO systems commonly employ multiple ($N_T$) transmit antennas and multiple ($N_R$) receive antennas for data transmission. The antennae can relate to both base stations and mobile devices, in one example, allowing bi-directional communication between the devices on the wireless network. To communicate data regarding transmission quality (e.g., control data), the devices and/or base stations can utilize a determined portion of bandwidth for transmitting acknowledgements/non-acknowledgements (ACK) and/or channel quality information (CQI). In multiple-access systems such as LTE, the control data is transmitted at either edge of a utilized frequency spectrum, and devices are expected to hop from one end to the other for a given time interval for transmitting the control data. However, where devices in the system communicate at a frequency lower than that specified by the system, such hopping is not easily attained. To compensate, some system configurations are adjusting the frequency capabilities of the devices in the system, but this approach is not always the most efficient or practical.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with facilitating transmitting and receiving control data using multiple hopping patterns to maintain frequency diversity. Devices having sufficient bandwidth as that utilized by the wireless communications network can hop between frequency blocks dedicated for control data while devices not having sufficient bandwidth can hop within a given frequency block. Moreover, the devices can be separated based on bandwidth capabilities and assigned one or more frequency blocks for transmitting control data based on the capabilities.

According to related aspects, a method for transmitting control data in a wireless communications network is provided. The method can comprise generating control data for a first device and mapping the control data to a portion of bandwidth reserved for control data based on a hopping pattern, the hopping pattern is a function of available bandwidth of the wireless communications network and of the first device. The method can also include transmitting the mapped control data to a second device according to the hopping pattern.

Another aspect relates to a wireless communications apparatus. The wireless communications apparatus can include at least one processor configured to map control data to symbols of bandwidth, having a plurality of frequency blocks reserved for control data, based at least in part on a hopping pattern, the hopping pattern includes hopping frequencies within one of the plurality of frequency blocks over a time period. The wireless communications apparatus can also include a memory coupled to the at least one processor.

Yet another aspect relates to a wireless communications apparatus that transmits control data according to a hopping pattern. The wireless communications apparatus can include means for mapping control data to one of a plurality of portions of available frequency pre-assigned for use with control data. The wireless communications apparatus can further include means for hopping within the portion of available frequency to map additional control data to provide frequency diversity.

Still another aspect relates to a computer program product, which can have a computer-readable medium including code for causing at least one computer to generate control data for a first device. Code can also be provided causing the at least one computer to map the control data to a portion of bandwidth reserved for control data based on a hopping pattern, the hopping pattern is a function of available bandwidth of the wireless communications network and of the first device. Moreover, code can be provided for causing the at least one computer to transmit the mapped control data to a second device according to the hopping pattern.

In accordance with another aspect, an apparatus in a wireless communication system can include a processor configured to map control data to one of a plurality of portions of available frequency pre-assigned for use with control data. The processor can also be configured to hop within the portion of available frequency to map additional control data to provide frequency diversity. Also, the apparatus can include a memory coupled to the processor.

According to a further aspect, a method for determining control data from devices utilizing different hopping patterns is provided. The method can include receiving a signal having a plurality of frequency blocks reserved for communicating control data and determining a control data hopping pattern for at least one device based at least in part on bandwidth capabilities of the device. The method can furthermore include decoding the control data according to the determined hopping pattern.

Another aspect relates to a wireless communications apparatus. The wireless communications apparatus can include at least one processor configured to receive control date from a plurality of devices on a signal having reserved frequency blocks for transmitting control data, the control data utilizes one of a plurality of hopping patterns based on device bandwidth capabilities. The wireless communications apparatus can also include a memory coupled to the at least one processor.

Yet another aspect relates to a wireless communication apparatus for interpreting control data utilizing various hopping patterns. The wireless communications apparatus can comprise means for receiving bandwidth capability information regarding a device. Additionally, the wireless communications apparatus can include means for determining a hopping pattern utilized by a device transmitting control data based at least in part on the bandwidth capability information as well as means for interpreting control data from a signal transmitted by the device based at least in part on the determined hopping pattern.

Still another aspect relates to a computer program product, which can have a computer-readable medium including code for code for causing at least one computer to receive a signal having a plurality of frequency blocks reserved for communicating control data. Furthermore, code can be provided that causes the at least one computer to determine a control data hopping pattern for at least one device based at least in part on bandwidth capabilities of the device. Also, code can be provided for causing the at least one computer to decode the control data according to the determined hopping pattern.

In accordance with another aspect, an apparatus can be provided in a wireless communication system including a processor configured to receive bandwidth capability information regarding a device. The process can also be configured to determine a hopping pattern utilized by a device transmitting control data based at least in part on the bandwidth capability information and interpret control data from a signal transmitted by the device based at least in part on the determined hopping pattern. Additionally, the apparatus can comprise a memory coupled to the processor.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

Figure 1:
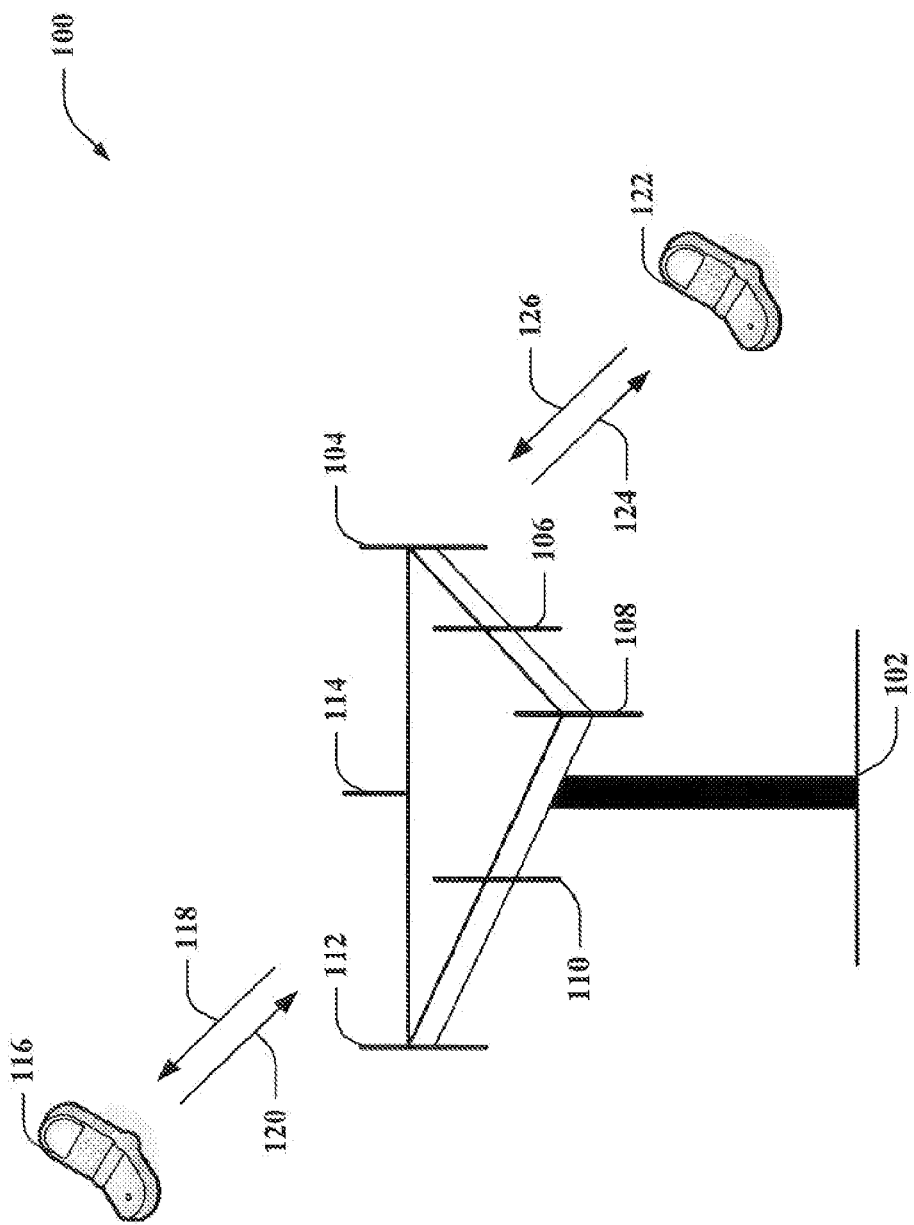
FIG. 1 is an illustration of a wireless communication system in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) can be practiced without these specific details. In other instances, well-known structures and devices are shown in block diagram form in order to facilitate describing one or more embodiments.

As used in this application, the terms "component," "module," "system," and the like are intended to refer to a computer-related entity, either hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Furthermore, various embodiments are described herein in connection with a mobile device. A mobile device can also be called a system, subscriber unit, subscriber station, mobile station, mobile, remote station, remote terminal, access terminal, user terminal, terminal, wireless communication device, user agent, user device, or user equipment (UE). A mobile device can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station can be utilized for communicating with mobile device(s) and can also be referred to as an access point, Node B, or some other terminology.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instructions) and/or data.

Referring now to FIG. 1, a wireless communication system 100 is illustrated in accordance with various embodiments presented herein. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 102 can communicate with one or more mobile devices such as mobile device 116 and mobile device 122; however, it is to be appreciated that base station 102 can communicate with substantially any number of mobile devices similar to mobile devices 116 and 122. Mobile devices 116 and 122 can be, for example, cellular phones, smart phones, laptops, handheld communication devices, handheld computing devices, satellite radios, global positioning systems, PDAs, and/or any other suitable device for communicating over wireless communication system 100. As depicted, mobile device 116 is in communication with antennas 112 and 114, where antennas 112 and 114 transmit information to mobile device 116 over a forward link 118 and receive information from mobile device 116 over a reverse link 120. Moreover, mobile device 122 is in communication with antennas 104 and 106, where antennas 104 and 106 transmit information to mobile device 122 over a forward link 124 and receive information fern mobile device 122 over a reverse link 126. In a frequency division duplex (FDD) system, forward link 118 can utilize a different frequency band than that used by reverse link 120, and forward link 124 can employ a different frequency band than that employed by reverse link 126, for example. Further, in a time division duplex (TDD) system, forward link 118 and reverse link 120 can utilize a common frequency band and forward link 124 and reverse link 126 can utilize a common frequency band.

Each group of antennas and/or the area in which they are designated to communicate can be referred to as a sector of base station 102. For example, antenna groups can be designed to communicate to mobile devices in a sector of the areas covered by base station 102. In communication over forward links 118 and 124, the transmitting antennas of base station 102 can utilize beamforming to improve signal-to-noise ratio of forward links 118 and 124 for mobile devices 116 and 122. Also, while base station 102 utilizes beamforming to transmit to mobile devices 116 and 122 scattered randomly through an associated coverage, mobile devices in neighboring cells can be subject to less interference as compared to a base station transmitting through a single antenna to all its mobile devices. Moreover, mobile devices 116 and 122 can communicate directly with one another using a peer-to-peer or ad hoc technology as depicted.

According to an example, system 100 can be a multiple-input multiple-output (MIMO) communication system. Further, system 100 can utilize substantially any type of duplexing technique to divide communication channels (e.g., forward link, reverse link, . . . ) such as FDD, TDD, and the like. The channels can be provided for transmitting control data between the mobile devices 116 and 122 and the base station (or from mobile device 116 to mobile device 122 in a peer-to-peer configuration, for example). In an example, the base station 102 can transmit acknowledgements or non-acknowledgements (ACK) to the mobile device 116 and 122, and the mobile device 116 and 122 can send channel quality information (CQI) to the base station 102. The ACKs can be used by the mobile devices 116 and 122 to determine if the base station 102 received communication, and the CQI data can be used by the base station 102 to allocate channel resources to the mobile devices 116 and 122.

In one example, the channels for transmitting the control date can be strategically placed in communications, such as at given frequency and/or given time periods, so the devices can discern the control channel to receive the control information. For example, the control channel can be predetermined in this regard and statically or dynamically configured within the mobile devices 116 and 122 and/or the base station 102. Moreover, the structure of control data on the control channel can be predetermined and configured as well. In some wireless multiple-access communication systems, such as third generation partnership project (3GPP) long term evolution (LTE), the control channel for a given mobile device 116/122 and/or base station 102 can be required or expected to move or hop frequencies within one or more time periods. However, where the mobile device 116/122, for example, operates at a lesser frequency or bandwidth capacity than the base station 102 and or the underlying network, certain hops in frequency might not be achievable without some guard time.

For example, in a 20 MHz 3GPP LTE wireless communications network, the mobile device 116 and/or 122 can be required to transmit control data on a logical channel at one end of the frequency during one time period and then hop to a channel at the other end of the frequency to achieve a frequency diversity; for a 10 MHz device, for example, this hop cannot typically be achieved where the hop spans more than the 10 MHz. Thus, in such a network where the network bandwidth is greater than the bandwidth of a portion mobile devices, alternative hopping can be used to achieve different frequency diversity for the control channels of the portion of devices. In one example pursuant to the 3GPP LTE scenario, the 19 MHz devices can hop within the control channels on one end of the frequency without having to hop to the other end of the entire frequency. However, mobile devices that are capable of the 20 MHz communication can continue to hop from one end of the frequency to the other end. In this regard, the minimum transfer frequency of the mobile devices 116 and/or 122 need not be modified, and frequency diversity is preserved for the control channels.

Figure 2:
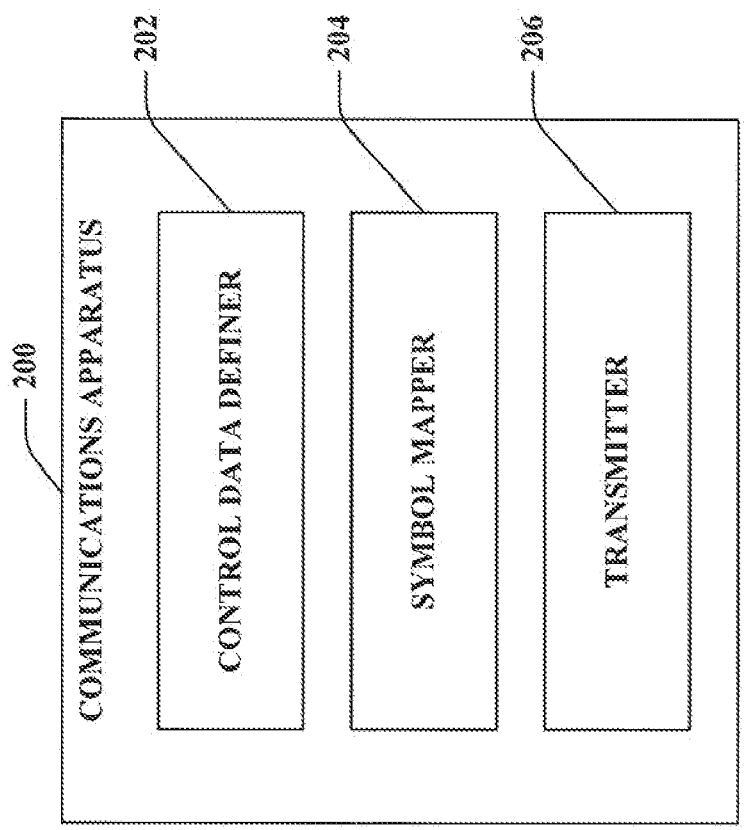
FIG. 2 is an illustration of an example communications apparatus for employment within a wireless communications environment.

Turning to FIG. 2, illustrated is a communications apparatus 200 for employment within a wireless communications environment. The communications apparatus 200 can be a base station or a portion thereof a mobile device or a portion thereof, or substantially any communications apparatus that receives data transmitted in a wireless communications environment. The communications apparatus 200 can include a control data definer 202 that formulates control data (e.g., ACK data and/or CQI data), a symbol mapper 204 that maps data or symbols to portions of frequency (e.g., tones of an OFDM symbol), and a transmitter 206 that transmits the mapped data.

According to an example, the communications apparatus 200 can communicate control data regarding a communications channel, for example, to one or more disparate devices. To facilitate this communication, the control data definer 202 can measure and formulate the control data, such as ACK data and/or CQI data, for example. The symbol mapper 204 can be leveraged to appropriately position the control data within the bandwidth for transmission; in one example, the appropriate bandwidth positions can require given control data to hop around the bandwidth. In one specific example, 3GPP LTE can position control data at the edges of available bandwidth and require a hop each given time interval. Where the hop is within range of the transmission rate available to the communications apparatus 200, the symbol mapper 204 can appropriately map the control data to hop between the higher range and lower range edges of the bandwidth.

However, where the transmission rate of the communications apparatus 200 is less than that needed for the hop, a smaller hop can be made. The smaller hop can be to a frequency different from the initial frequency but still in the range of the initial edge dedicated to control data. For example, in a 20 MHz 3GPP LTE network having 3 MHz at each edge available for control data (leaving 14 MHz for other data), the minimum hop for control data for a 20 MHz capable communications apparatus is substantially 14 MHz. Thus, for a 10 MHz capable communications apparatus, hopping can occur within the 3 MHz section of bandwidth that the control channel is originally assigned. Thus, the maximum hop is substantially 3 MHz, which can be attained by a 10 MHz capable communications apparatus. The 20 MHz capable communications apparatuses can continue to hop from one edge to the other. Additionally, where the system or network bandwidth is substantially equal to that of substantially all communications apparatuses therein, the communications apparatuses can hop from one edge of the bandwidth to another as well. The symbol mapper 204 can assign control data to the symbols according to the hopping structure chosen.

In another example, where a network, such as a 3GPP LTE network, has a portion of communications apparatuses capable of lesser bandwidth than that of the network, the control channels can be asymmetrically structured at the edges of the available bandwidth. It is to be appreciated that the asymmetric structure can be specified proportionately as the number of communications apparatuses that can communicate at the network bandwidth to those that cannot. Thus, using the example above, at one edge of a 20 MHz bandwidth, the edge-most 2 MHz can be used for control data, and at the other edge, the edge-most 4 MHz can be used giving, again, 6 MHz total for control data. In one example, the lesser capable communications apparatuses (e.g., 10 MHz capable communications apparatuses) can utilize the 4 MHz portion to hop therein in given time periods, and those capable of the full network hop can hop within the 2 MHz edge. The symbol mapper 204 can be utilized to provide this hopping functionality. In this way, frequency diversity for control data is achieved for communications apparatuses having multiple throughput capabilities. The transmitter 206 can transmit the symbols mapped by the symbol mapper 204. It is to be appreciated that the symbols can be encoded, modulated, etc. prior to transmitting and/or mapping.

Figure 3:
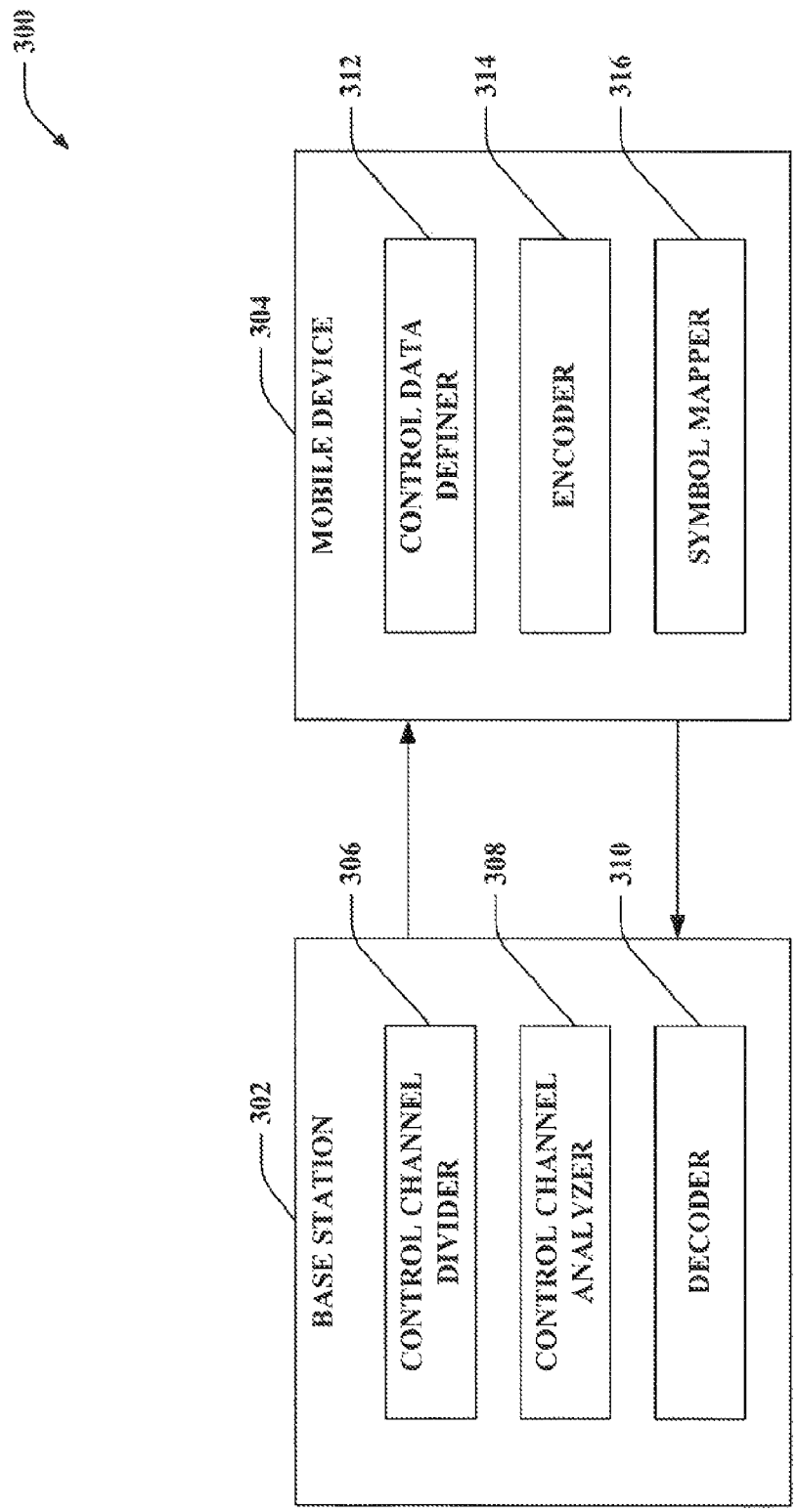
FIG. 3 is an illustration of an example wireless communications system that effectuates transmitting and receiving control data.

Now referring to FIG. 3, illustrated is a wireless communications system 300 that can communicate control data while promoting frequency diversity by hopping. The system 300 includes a base station 302 that communicates with a mobile device 304 (and/or any number of disparate mobile devices (not shown)). Base station 302 can transmit information to mobile device 304 over a forward link channel; further base station 302 can receive information from mobile device 304 over a reverse link channel. Moreover, system 300 can be a MIMO system. Additionally, the system 300 can operate in an OFDMA wireless network, a 3GPP LTE wireless network, etc. Also, the components and functionalities shown and described below in the base station 302 can be present in the mobile device 304 as well and vice versa, in one example; the configuration depicted excludes these components for ease of explanation.

Base station 302 includes a control channel divider 306 that can reserve portions of communications channels for transmitting control data, such as ACK, and/or CQI data, a control channel analyzer 308 that can discern control data from the control channels according to a format and/or hopping structure, and a decoder 310 that can decode the control data for use in the base station 302. According to an example, the base station 302 can receive communication and leverage the control channel divider 306 to determine the control data structure within the received communication. The control channel analyzer 308 can subsequently be utilized to obtain the control channels from the communication, and the decoder 310 can decode the channels and retrieve the control data.

Mobile device 304 includes a control data definer 312 that can generate control data to be sent to the base station 302, such as CQI data and/or ACK information, an encoder 314 to encode the control data to be sent, and a symbol mapper 316 to map the encoded data to symbols (or tones thereof in an OFDM network, for example). The symbols can be sent to the base station 302 where they can be received and analyzed according to a format or structure thereof. In one example, the symbols can be mapped by the symbol mapper 316 according to the hopping structures described supra, and the base station 302 can receive the symbols, determine the control channels using the control channel analyzer 308, and decode the data using the decoder 310; the decoding relates to the encoding performed by the encoder 314 before transmission.

In one example, the mobile device 304 can establish a communications channel with the base station 302, and can also receive control data communication information, such as frequencies for communication and/or hopping information. It is to be appreciated that this control data communication information can be sent to the mobile device 304 from the base station 302, sent from a disparate device, pre-coded within the mobile device 304 or otherwise configured in the mobile device 304, for example. The control data communication information can include specifications for communicating control data for devices having substantially the same or greater bandwidth capabilities than the current bandwidth utilized by the base station 302 and that for mobile devices 304 having lower bandwidth capabilities. This can be advantageous in a 3GPP LTE network configuration as described supra, for example. It is to be appreciated, in this regard, that the instructions, if transmitted by the base station 302, can be formulated based on acquiring the bandwidth capabilities of the mobile device 304 in one example.

The control data definer 312 can acquire control date, such as ACK or CQI data for example, to transmit to the base station 302, and the encoder 314 can encode the control data. Subsequently, the symbol mapper 316 can place the control data in the appropriate portion of frequency as defined by the control data communication information received. As mentioned, in a 3GPP LTE network or similar configuration, this can include hopping the data for frequency diversity based on bandwidth capabilities of the mobile device 304. If the mobile device 304 cannot hop across the entire available bandwidth due to bandwidth constraints, the control data communication information can specify that the control data be hopped within control frequency on one dedicated edge of the bandwidth. If the mobile device 304 has the ability to utilize the entire bandwidth of the communication channel, the control data communication information can specify that hopping is to occur from one edge of the bandwidth to the other. The symbol mapper 316 can appropriately implement the hopping scheme maintaining frequency diversity for mobile devices 304 of multiple capabilities. Subsequently, the mobile device 304 can transmit the control data on the control channel to the base station 302.

Upon receiving data from a mobile device 304, the base station 302 can discern control data by leveraging the control channel divider 306 to determine the structure of the control channels within the bandwidth. As mentioned, the control channels can be implemented synchronously or asynchronously (e.g., based on a ratio of network bandwidth capable devices to network bandwidth incapable devices). The control channel analyzer 308 can determine relevant portions of the bandwidth that relate to the control data. This can be based on, for example, the specifications sent to the mobile device 304. Subsequently, the decoder 310 can decode the control data for further use with the base station 302. For example, where the control data is CQI data, it can be used to allocate additional resources to the communications channel if necessary. Furthermore, it is to be appreciated that the control channels are not limited to being at the edges of the frequency, rather as long as the devices are hopping locally within a capable bandwidth, the reserved control channel frequency or frequencies can be located substantially anywhere in the available bandwidth.

Figure 4:
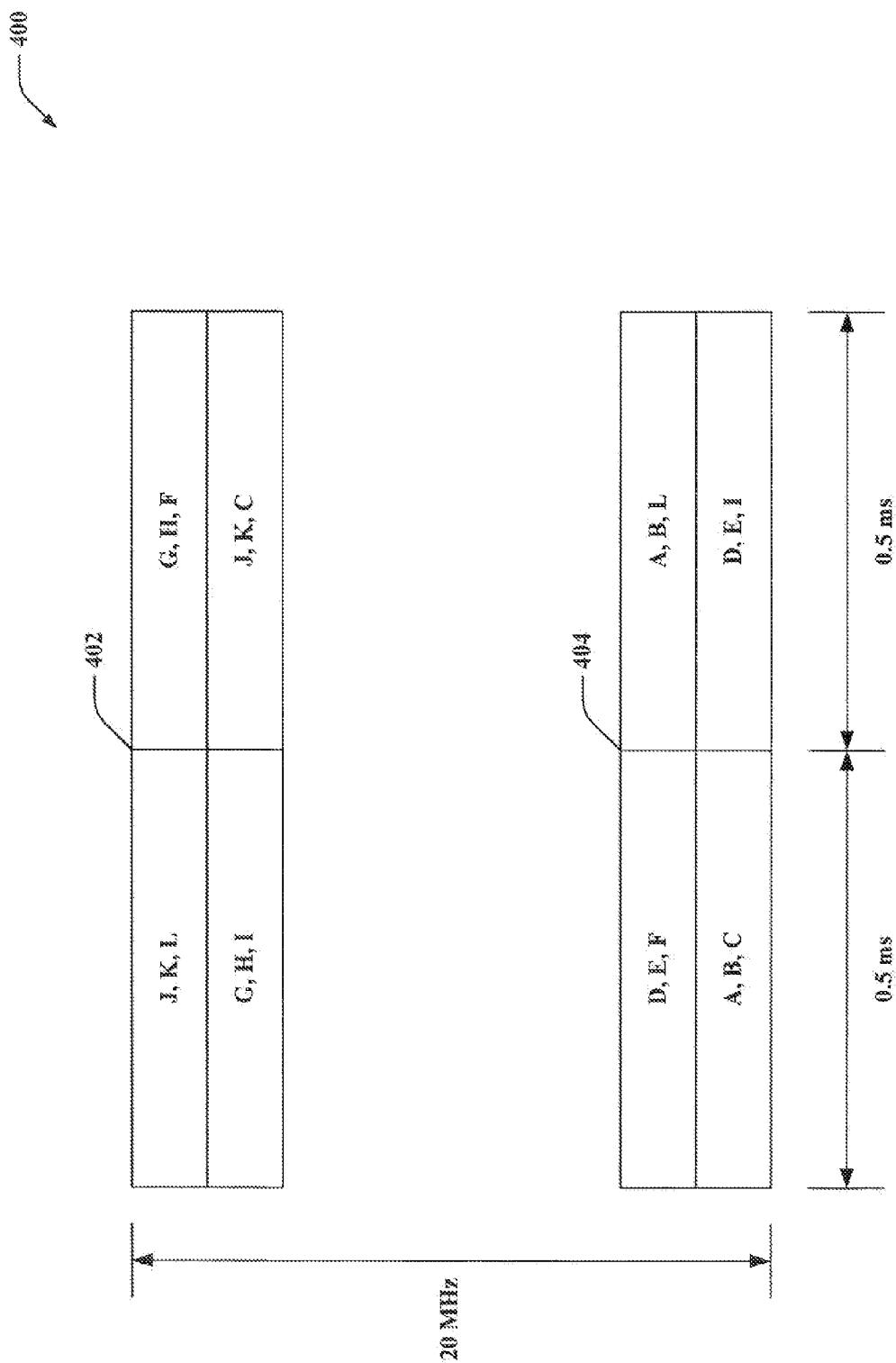
FIG. 4 is an illustration of example control frequency block utilization.

Now referring to FIG. 4, a sample synchronous control structure 400 utilizing hopping patterns for devices having disparate bandwidth capabilities in a wireless communications network is illustrated. The control structure 400 utilizes the edges of the bandwidth to transmit control data. The four boxes at 402 and at 404 represent control channels for a variety of devices; devices hop once within the transfer time interval (which is 1.0 ms in this example), the total bandwidth is 20 MHz, and the control channels utilized at 402 and 404 can be substantially the same bandwidth size in this example. It is to be appreciated that substantially any time period or frequency (total and/or control frequency) can be used and the time periods do not have to be equal. Moreover, the hopping structure can occur over more than just two time periods (e.g., more than just one hop in a transmission time interval) as depicted; the numbers and metrics used in the figure are chosen for the purposes of explanation.

In this example, devices labeled C, L, F, and I, are capable of transmitting at sufficient frequency to hop across the bandwidth for control frequency diversity purposes. Devices labeled A, B, D, E, G, H, J, and K are not so capable without some guard time; however, these devices can transmit across a single control frequency edge. In this regard, from the first time period to the second, devices I and L, which are in the top edge control frequency, hop to the bottom edge control frequency; however, devices G and H hop to a frequency above, and devices J and K to a frequency below, but not all the way to the bottom edge. Likewise, devices C and F hop from the bottom edge to the top edge from one time period to the next while devices A and B hop to a frequency above, but not all the way to the top edge, and D and E hop to a frequency below. Thus, the hopping is implemented for control channel frequency diversity without changing the bandwidth capabilities of the mobile devices while staying within available bandwidth for the devices for consecutive time periods. It is to be appreciated that the control channels are not limited to being at the edge of the frequency, rather as long as the devices are hopping locally within a capable bandwidth, the reserved control channel frequency or frequencies can be located substantially anywhere in the available bandwidth. As depicted, for 10 MHz capable devices, the utilized bandwidth for control channels is less than 10 MHz as it is shown as less than half of the 20 MHz bandwidth. Thus, the control channels need not be at the very bottom edge, but could be moved up so long as the total space for the devices to hop is less than 10 MHz in this example.

Figure 5:
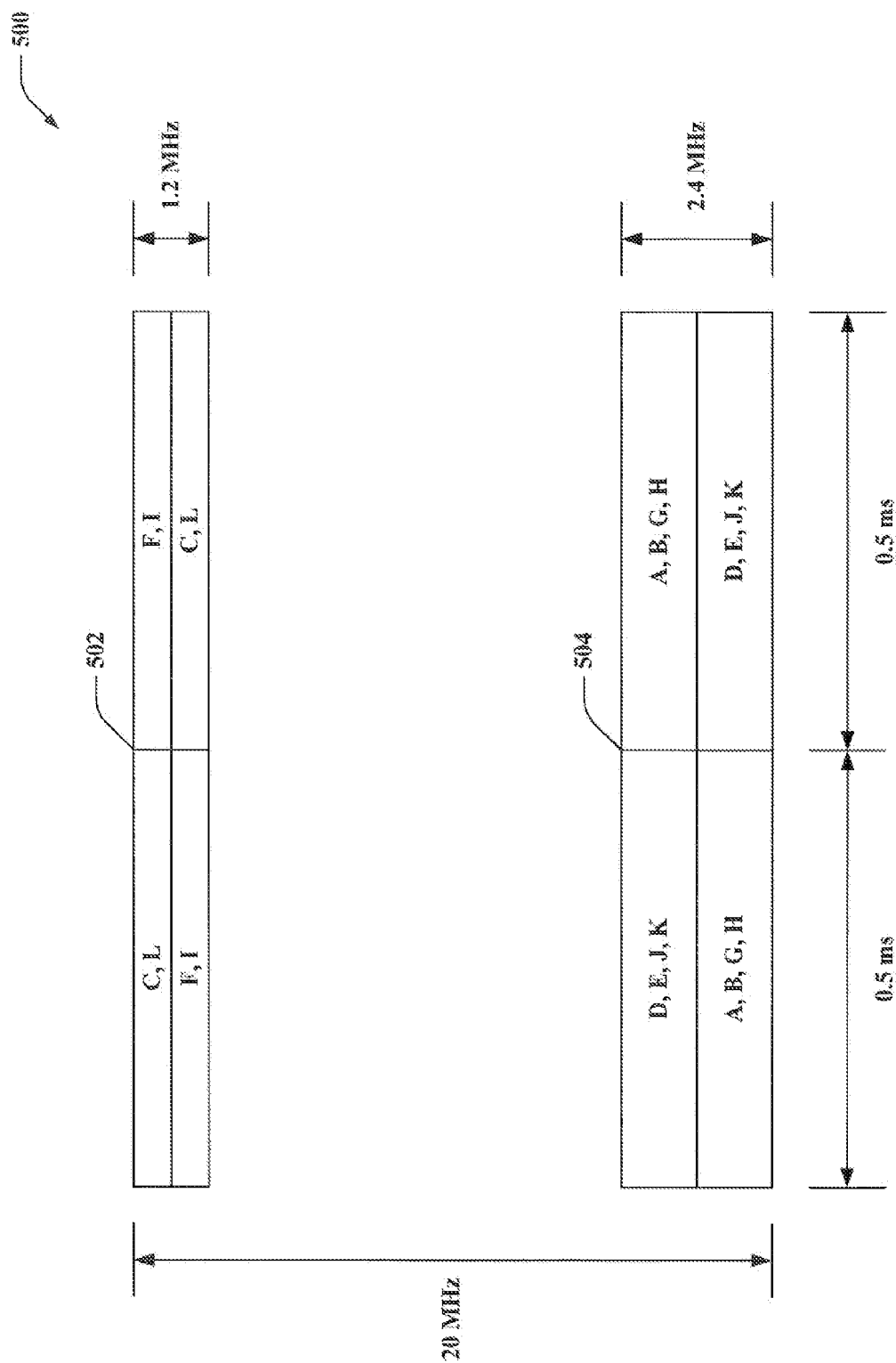
FIG. 5 is an illustration of example asynchronous control frequency block utilization.

Now turning to FIG. 5, illustrated is a sample asynchronous control structure 500 utilizing hopping patterns for devices having disparate bandwidth capabilities in a wireless communications network. The control structure 500 utilizes the edges of the bandwidth to transmit control data. The four boxes at 502 and at 504 represent control channels for a variety of devices; devices hop once within the transfer time interval (which is 1.0 ms in this example), the total bandwidth is 20 MHz, and the control channels at 502 and 504 can utilize different bandwidth sizes in this example. Furthermore, devices having sufficiently different bandwidth capabilities can have control channels at separate edges of the bandwidth, it is to be appreciated that substantially any time period or frequency (total and/or control frequency) can be used and the time periods do not have to be equal. Moreover, the hopping structure can occur over more than just two time periods (e.g., more than just one hop in a transmission time interval) as depicted; the numbers and metrics used in the figure are chosen for the purposes of explanation.

In this example, devices labeled C, L, F, and I, are capable of transmitting at a different frequency than devices labeled A, B, D, E, G, H, J, and K. The devices grouped in the same class can hop control frequency in a single edge of the bandwidth. Thus, C, L, F, and I all hop within the top edge from first time interval to the second, and A, B, D, E, G, H, J, and K hop within the bottom edge. Thus, the frequency diversity is maintained for control channels, and the devices do not have to hop beyond capacity. It is to be appreciated that device C, L, F, and I can have a smaller bandwidth capability as compared to the network in this example as the hop required is substantially smaller than the system bandwidth.

As the top frequency edge requires room for only four devices to transmit control data in, this example, the size of the frequency region dedicated to control data can be smaller than the bottom frequency, which requires room for eight devices. As mentioned, the control frequency edges can be partitioned based at least in part on the size needed for device capabilities. For example, if 3.6 MHz is desired for total control channel allocation, the channels at the edges can be split proportionately to the devices utilizing the channel. Since there are twice as many similarly capable devices in the bottom edge, twice the bandwidth (or 2.4 MHz) can be allocated to that edge and the remainder (1.2 MHz) to the top edge. It is to be appreciated that the numbers are merely for example; substantially any number or size of frequency, allocation, or the like can be utilized in this regard.

Figure 6:
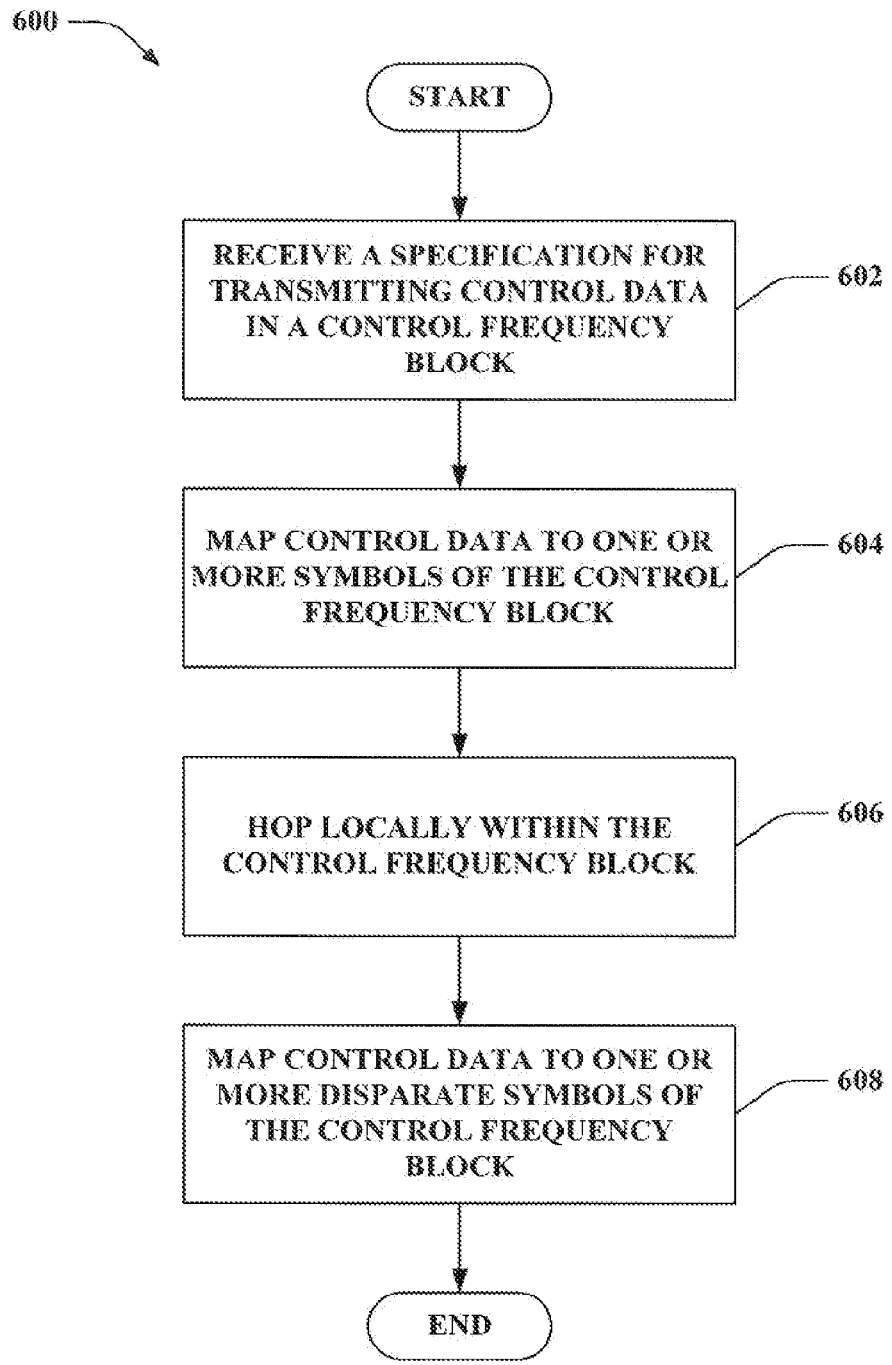
FIG. 6 is an illustration of an example methodology that facilitates mapping control data according to a hopping pattern.
Figure 7:
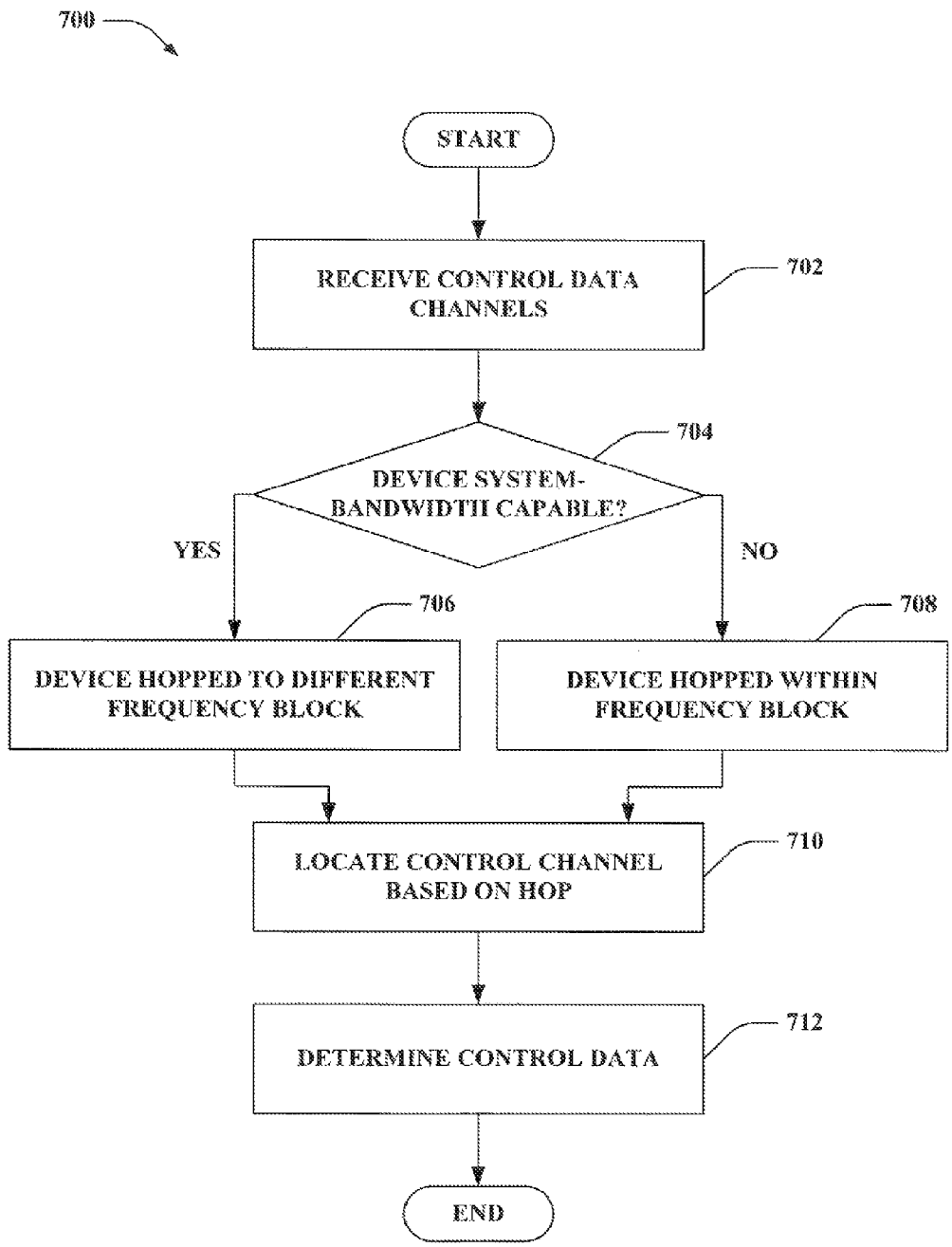
FIG. 7 is an illustration of an example methodology that facilitates interpreting received control data.

Referring to FIGS. 6-7, methodologies relating to providing control channel hopping for devices in a wireless communication network having disparate bandwidth capabilities are illustrated. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more embodiments.

Turning to FIG. 6, illustrated is a methodology 600 that facilitates transmitting control data according to a hopping pattern for a device having lower throughput than the network bandwidth utilized or at least a lower throughput than is required to hop between control channels in non-adjacent frequencies. At 602, a specification is received regarding transmitting control data in a control frequency block. The specification can be received from substantially any source including a related device, a preconfigured source, a party to network communication, an inference made by a disparate device or about a disparate device, etc. At 604, control data can be mapped to one or more symbols of the control frequency block for transmission thereof, for example. The block, in one example, can be at one edge of available frequency.

At 606, a hop can be made locally within the control block to provide frequency diversity for the control channel. As described supra, the hop within the control channel allows a device with lower bandwidth capability to make the hop rather than requiring a hop to the other edge of the available bandwidth, in one example (e.g., 3GPP LTE). At 608, control data can be mapped to one or more disparate symbols to which the hop was made within the control frequency block. It is to be appreciated that capable devices can hop to and from edges of the bandwidth while the non-capable devices hop within a given block. The non-capable devices, for example, can be distributed to a given edge proportionally or otherwise.

Now referring to FIG. 7, a methodology 700 that facilitates interpreting control data from control channels with devices using disparate hopping patterns is illustrated. At 702, control data channels are received, for example, by determining position within the bandwidth. In one example, the control date channels are at a top and bottom edge of the bandwidth and span a certain length thereof. At 704, it is determined whether the device for which control information is sought is a system-bandwidth capable device (e.g., whether the device transmits at least the same level as the network). If so, then it is determined that the device hops to different frequency blocks when transmitting control data at 706. If not, then it is determined that the device hops within, a single frequency block when transmitting control data at 708. Using this information, the relevant control data channel can be located based on the hop at 710. At 712, the control data can be determined and utilized, for example.

It will be appreciated that, in accordance with one or more aspects described herein, inferences can be made regarding determining a hopping pattern used for control channel transmission by a device in a wireless communications network as described. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probablistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

According to an example, one or more methods presented above can include making inferences pertaining to utilizing a hopping pattern, for example whether to hop within a dedicated frequency or across dedicated frequencies. By way of farther illustration, an inference can be made with regard to determining a hopping pattern used by a transmitting device to properly receive control data therefrom.

Figure 8:
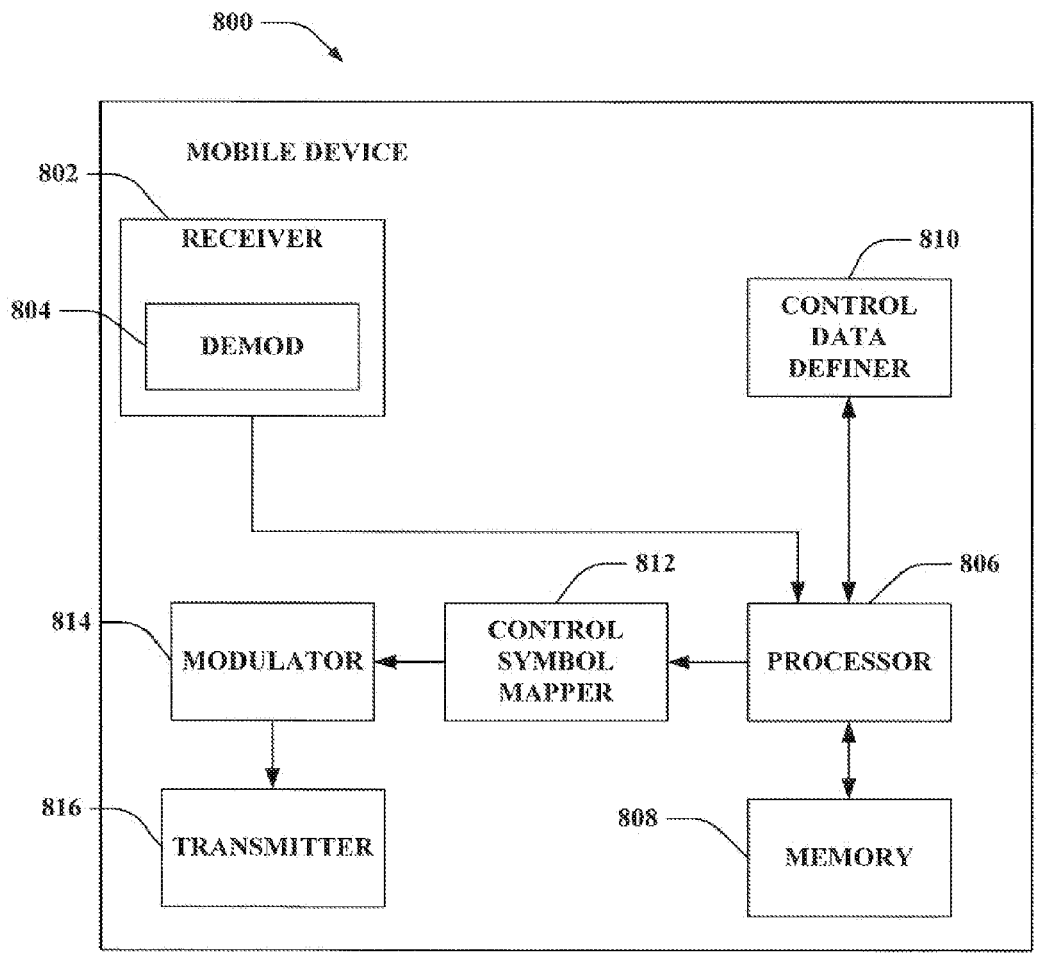
FIG. 8 is an illustration of an example mobile device that facilitates transmitting control data according to a hopping pattern.

FIG. 8 is an illustration of a mobile device 800 that facilitates transmitting control data according to one or more hopping patterns. Mobile device 800 comprises a receiver 802 that receives a signal from, for instance, a receive antenna (not shown), performs typical actions on (e.g., filters, amplifies, downconverts, etc.) the received signal, and digitizes the conditioned signal to obtain samples. Receiver 802 can comprise a demodulator 804 that can demodulate received symbols and provide them to a processor 806 for channel estimation. Processor 806 can be a processor dedicated to analyzing information received by receiver 802 and/or generating information for transmission by a transmitter 816, a processor that controls one or more components of mobile device 800, and/or a processor that both analyzes information received by receiver 802, generates information for transmission by transmitter 816, and controls one or more components of mobile device 800.

Mobile device 800 can additionally comprise memory 808 that is operatively coupled to processor 806 and that can store data to be transmitted, received data, information, related to available channels, data associated with analyzed signal and/or interference strength, information related to an assigned channel, power, rate, or the like, and any other suitable information for estimating a channel and communicating via the channel. Memory 808 can additionally store protocols and/or algorithms associated with estimating and/or utilizing a channel (e.g., performance based, capacity based, etc.).

It will be appreciated that the data store (e.g., memory 808) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ES-DRAM), Synchlink DRAM (SLDRAM), and direct Rambus RAM (DRRAM). The memory 808 of the subject systems and methods is intended to comprise, without being limited to, these and any other suitable types of memory.

Processor 806 can further be operatively coupled to a control data definer 810 that generates control data and a control symbol mapper 812 than can map the control data to symbols according to a hopping pattern, for example. In one example, the control data definer 810 can gather or generate control data to send to a device that is in communication with the mobile device 800 (or a disparate device). The control data can include, for example, ACK and/or CQI information and can be gathered from other components, the processor 806, etc. Once the data is defined, the control symbol mapper can be utilized 812, by the processor 806 for example, to appropriately map the data to symbols or portions of frequency dedicated to control data. As described previously, this can include utilizing a hopping pattern by which the date is sent on a disparate control frequency for given time periods. For example, where the mobile device 800 is capable of communicating at the system bandwidth level, the hop can occur across multiple dedicated control frequency blocks. However, where the mobile device 800 lacks the bandwidth to make a frequency block hop, the control symbol mapper 812 can hop within the frequency block to a different frequency and map data to symbols in the disparate frequency. In this regard, the frequency diversity can be preserved for control data.

Moreover, as mentioned, the control data hopping pattern definition can be generated by the mobile device 800 based on bandwidth capabilities, hard-coded in the mobile device 800 or another device, communicated by a separate device, such as base station or other wireless communications network component, or the like. Mobile device 800 still further comprises a modulator 814 and transmitter 816 that respectively modulate and transmit signal to, for instance, a base station, another mobile device, etc. Although depicted as being separate from the processor 806, it is to be appreciated that the control data definer 810, control symbol mapper 812, demodulator 804, and/or modulator 814 can be part of the processor 806 or multiple processors (not shown).

Figure 9:
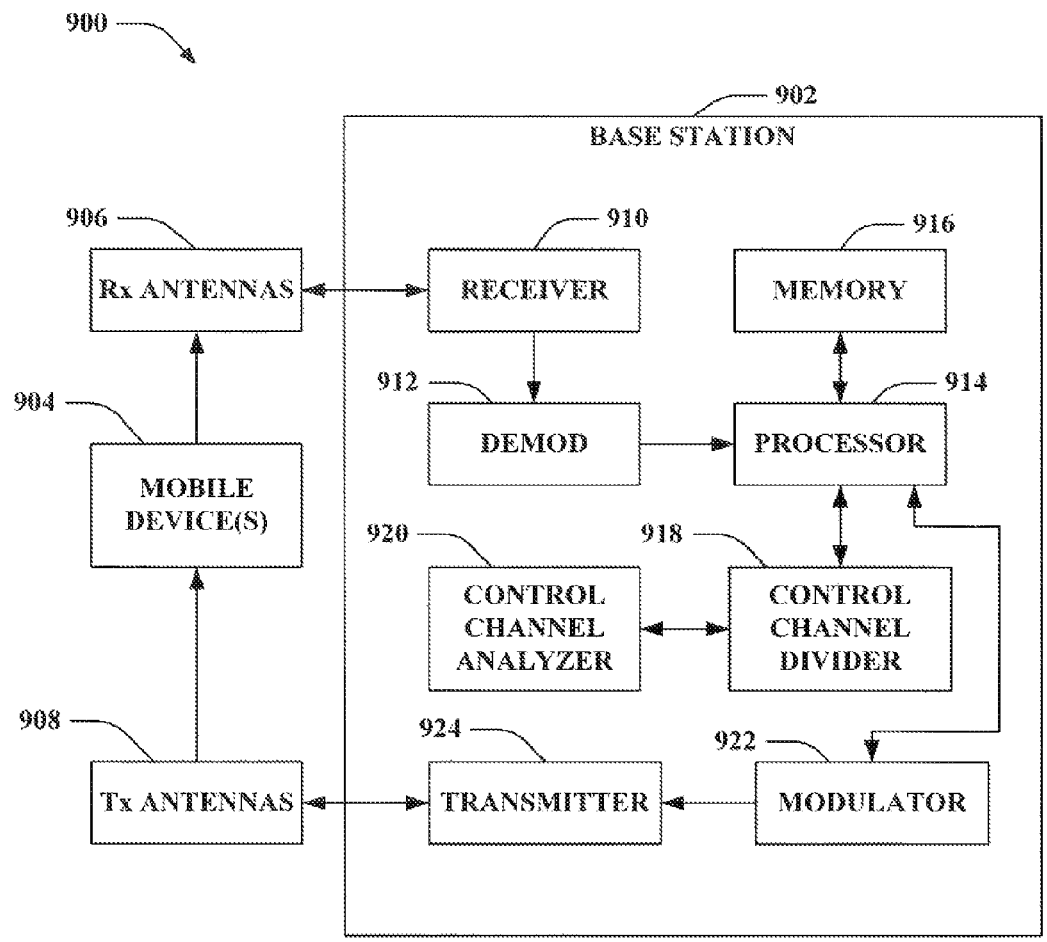
FIG. 9 is an illustration of an example system that facilitates interpreting received control data.

FIG. 9 is an illustration of a system 900 that facilitates receiving and interpreting control data according to a hopping pattern. The system 900 comprises a base station 902 (e.g., access point, ...) with a receiver 910 that receives signal(s) from one or more mobile devices 904 through a plurality of receive antennas 906, and a transmitter 924 that transmits to the one or more mobile devices 904 through a transmit antenna 908. Receiver 910 can receive information from receive antennas 906 and is operatively associated with a demodulator 912 that demodulates received information. Demodulated symbols are analyzed by a processor 914 that can be similar to the processor described above with regard to FIG. 8, and which is coupled to a memory 916 that stores information related to estimating a signal (e.g., pilot) strength and/or interference strength, data to be transmitted to or received from mobile device(s) 904 (or a disparate base station (not shown)), and/or any other suitable information related to performing the various actions and functions set forth herein. Processor 914 is further coupled to a control channel divider 918 that determines portions of a communication channel reserved for control data and a control channel analyzer 920 that can discern control data from signals received over the communication channel.

According to an example, the control channel divider 918 can specify portions of bandwidth that are reserved for control data communication; these can be at the edges of the bandwidth (such as in a 3GPP LTE configuration), or at substantially any location in the bandwidth. The portions can be specified based on hard-coded specifications, real-time configurations, received from disparate devices or network components, etc. Subsequently, the control channel analyzer 920 can be utilized to retrieve control data from transmissions sent by mobile devices 904 or other devices. The control channel analyzer 920 can retrieve the control data based on the specification generated by the control channel divider 918 and/or based on hopping patterns for the mobile devices 904. It is to be appreciated that hopping patterns can be specified by mobile devices 904 or the base station 902 upon establishing communications channels, or otherwise pre-coded or configured within the base station 902. The hopping pattern can be at least one described herein. Upon discerning the hopping pattern used in communication, the control channel analyzer 920 can appropriately retrieve the control data from the communication channel. Furthermore, although depicted as being separate from the processor 914, it is to be appreciated that the control channel divider 918, control channel analyzer 920, demodulator 912, and/or modulator 922 can be part of the processor 914 or multiple processors (not shown).

Figure 10:
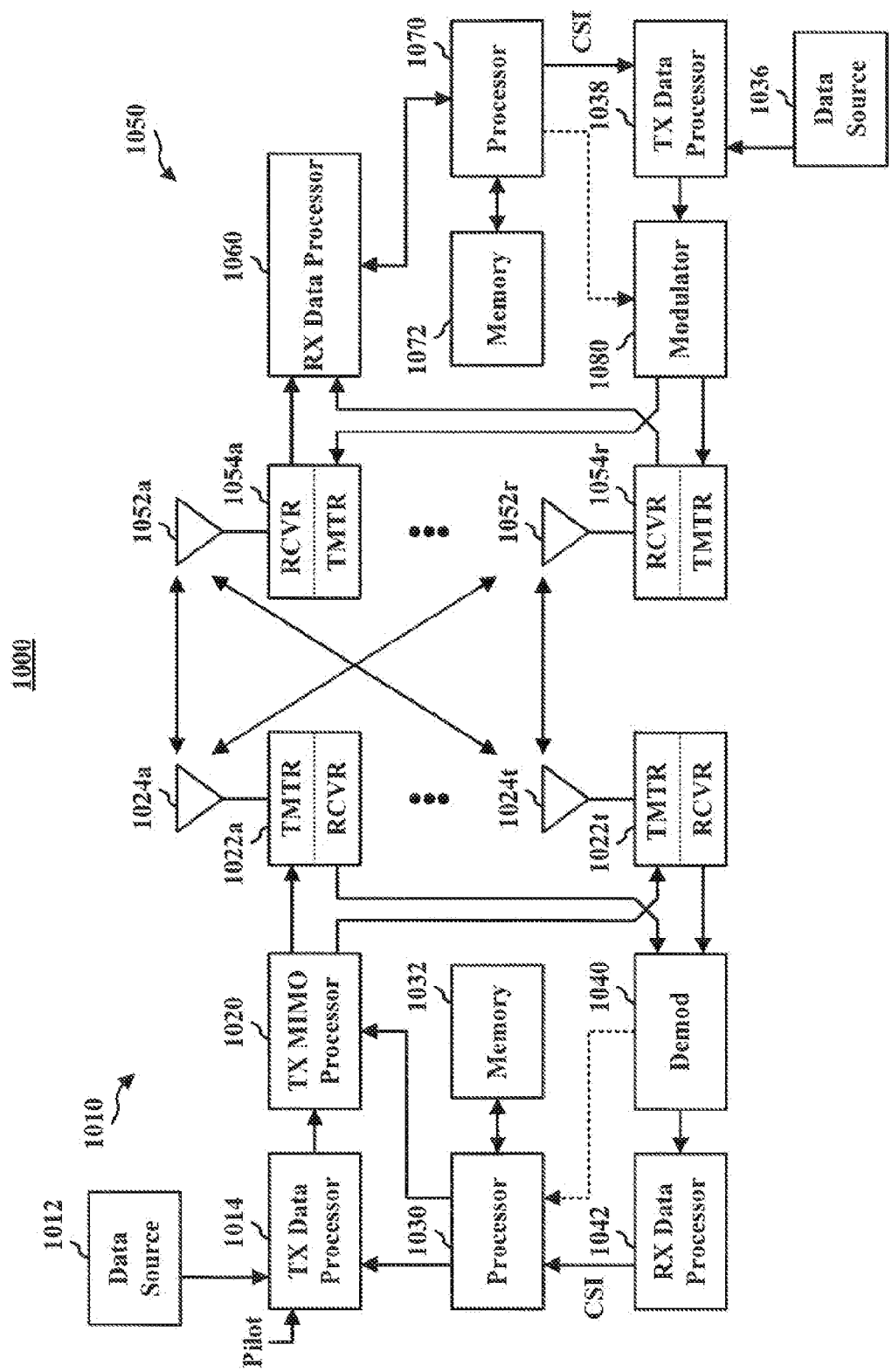
FIG. 10 is an illustration of an example wireless network environment that can be employed in conjunction with the various systems and methods described herein.

FIG. 10 shows an example wireless communication system 1000. The wireless communication system 1000 depicts one base station 1010 and one mobile device 1050 for sake of brevity. However, it is to be appreciated that system 1000 can include more than one base station and/or more than one mobile device, wherein additional base stations and/or mobile devices can be substantially similar or different from example base station 1010 and mobile device 1050 described below. In addition, it is to be appreciated that base station 1010 and/or mobile device 1050 can employ the systems (FIGS. 1-3 and 8-9), techniques/configurations (FIGS. 4-5) and/or methods (FIGS. 6-7) described herein to facilitate wireless communication there between.

At base station 1010, traffic data for a number of data streams is provided from a data source 1012 to a transmit (TX) data processor 1014. According to an example, each data stream can be transmitted over a respective antenna. TX data processor 1014 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 1050 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 1030.

The modulation symbols for the data streams can be provided to a TX MIMO processor 1020, which can further process the modulation symbols (e.g., for OFDM). TX MIMO processor 1020 then provides $N_T$ modulation symbol streams to $N_T$ transmitters (TMTR) 1022a through 1022t. In various embodiments, TX MIMO processor 1020 applies beamforming weights to the symbols of the data streams and to the antenna from which the symbol is being transmitted.

Each transmitter 1022 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 1022a through 1022t are transmitted from $N_T$ antennas 1024a through 1024t, respectively.

At mobile device 1050, the transmitted modulated signals are received by $N_R$ antennas 1052a through 1052r and the received signal, from each antenna 1052 is provided to a respective receiver (RCVR) 1054a through 1054r. Each receiver 1054 conditions (e.g., filters, amplifies, and downconverts) a respective signal, digitizes the conditioned signal to provide samples, and further processes the samples to provide a corresponding "received" symbol stream.

An RX data processor 1060 can receive and process the $N_R$ received symbol streams from $N_R$ receivers 1054 based on a particular receiver processing technique to provide $N_T$ "detected" symbol streams. RX data processor 1060 can demodulate, deinterleave, and decode each detected symbol stream to recover the traffic data for the data stream. The processing by RX data processor 1060 is complementary to that performed by TX MIMO processor 1020 and TX data processor 1014 at base station 1010.

A processor 1070 can periodically determine which preceding matrix to utilize as discussed above. Further, processor 1070 can formulate a reverse link message comprising a matrix index portion and a rank value portion.

The reverse link message can comprise various types of information regarding the communication link and/or the received data stream. The reverse link message can be processed by a TX data processor 1038, which also receives traffic data for a number of data streams from a data source 1036, modulated by a modulator 1080, conditioned by transmitters 1054a through 1054r, and transmitted back to base station 1010.

At base station 1010, the modulated signals from mobile device 1050 are received by antennas 1024, conditioned by receivers 1022, demodulated by a demodulator 1040, and processed by a RX data processor 1042 to extract the reverse link message transmitted by mobile device 1050. Further, processor 1030 can process the extracted message to determine which preceding matrix to use for determining the beamforming weights.

Processors 1030 and 1070 can direct (e.g., control, coordinate, manage, etc.) operation at base station 1010 and mobile device 1050, respectively. Respective processors 1030 and 1070 can be associated with memory 1032 and 1072 that store program codes and data. Processors 1030 and 1070 cart also perform computations to derive frequency and impulse response estimates for the uplink and downlink, respectively.

It is to be understood that the embodiments described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, of a combination thereof.

When the embodiments are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

Figure 11:
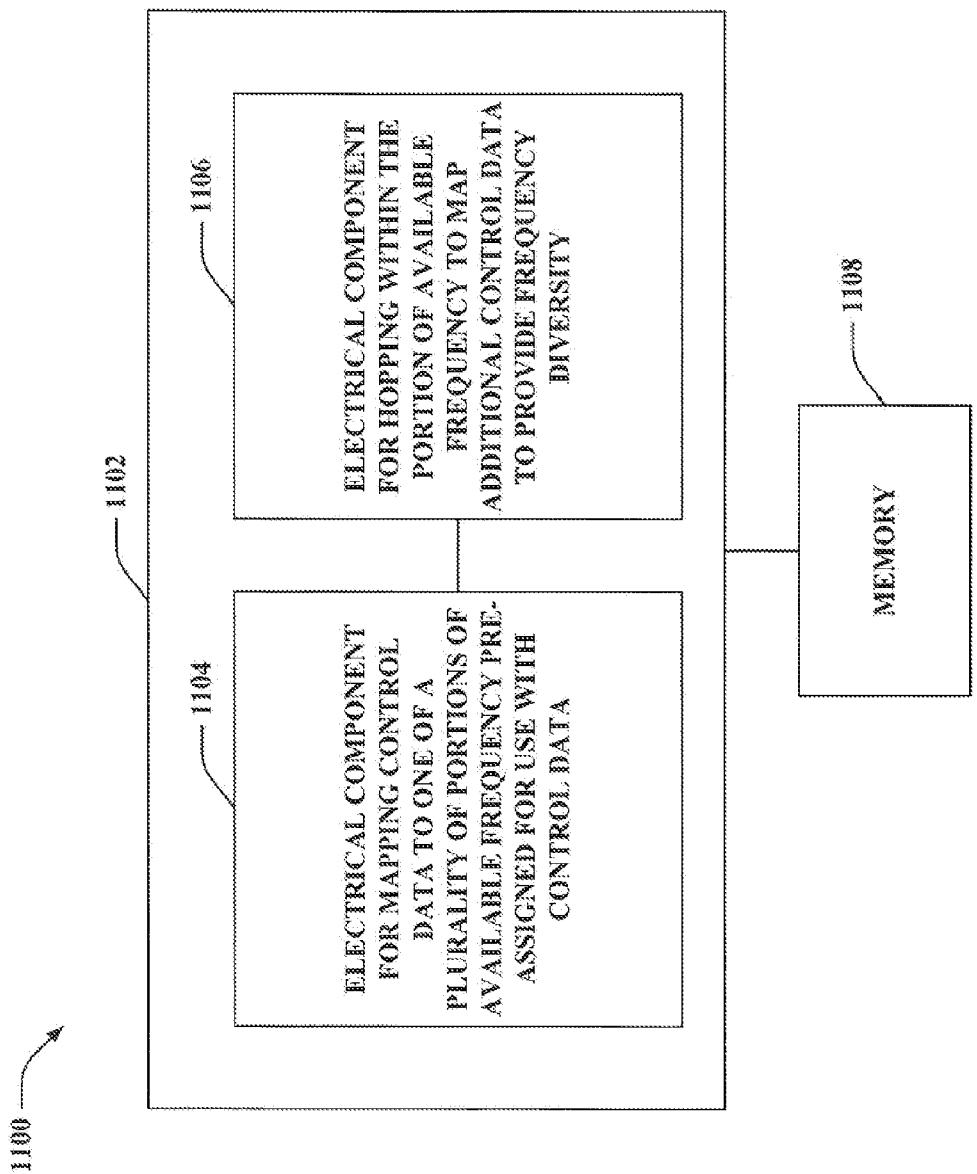
FIG. 11 is an illustration of an example system that maps control data according to a hopping pattern.

With reference to FIG. 11, illustrated is a system 1100 that maps control data to frequencies pre-assigned for control data use according to a hopping pattern. For example, system 1100 can reside at least partially within a base station, mobile device, etc. It is to be appreciated that system 1100 is represented as including functional blocks, which can be functional blocks that represent functions implemented by a processor, software, or combination thereof (e.g., firmware). System 1100 includes a logical grouping 1102 of electrical components that can act in conjunction. For instance, logical grouping 1102 can include an electrical component for mapping control date to one of a plurality of portions of available frequency pre-assigned for use with control data 1104. For example, the portions of frequency can be specified throughout the available bandwidth. For instance, a 3GPP LTE configuration reserves the edges of available bandwidth for control data. For devices that cannot communicate over the entire bandwidth, hopping from one edge to another may not be possible without some guard time. Further, logical grouping 1102 can comprise an electrical component for hopping within the portion of available frequency to map additional control data to provide frequency diversity 1106. For example, in the 3GPP LTE configuration mentioned above, devices not capable of hopping from one edge reserved for control data frequency to the other, hopping cars occur within a single edge to preserve frequency diversity. It is to be appreciated that capable devices, however, can hop across edges of the bandwidth. Additionally, system 1100 can include a memory 1108 that retains instructions for executing functions associated with electrical components 1104 and 1106. While shown as being external to memory 1108, it is to be understood that one or more of electrical components 1104 and 1106 can exist within memory 1108.

Figure 12:
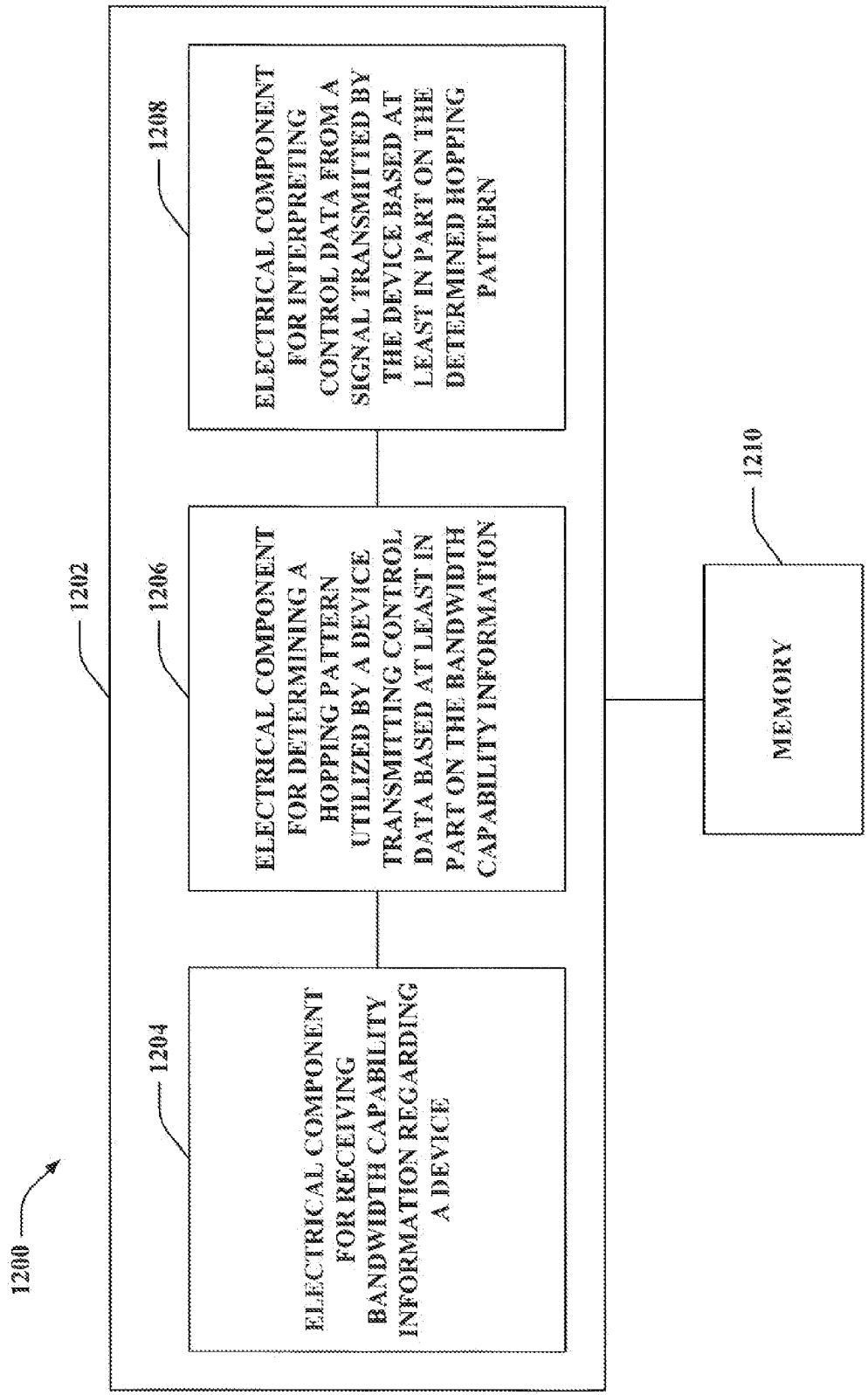
FIG. 12 is an illustration of an example system that interprets control data based on a determined utilized hopping pattern.

Turning to FIG. 12, illustrated is a system 1200 receives and interprets control data from devices using disparate hopping patterns in a wireless communications network. System 1200 can reside within a base station, mobile device, etc., for instance. As depicted, system 1200 includes functional blocks that can represent functions implemented by a processor, software, or combination thereof (e.g., firmware). System 1200 includes a logical grouping 1202 of electrical components that facilitate receiving and interpreting the control data. Logical grouping 1202 can include an electrical component for receiving bandwidth capability information regarding a device 1204. Thus, the device can be evaluated and compared to the bandwidth utilized by the wireless communications network. In this regard, devices having less bandwidth capabilities can be assigned hopping patterns with shorter hops to maintain frequency diversity. Moreover, logical grouping 1202 can include an electrical component for determining a hopping pattern utilized by a device transmitting control data based at least in part on the bandwidth capability information 1206. In this regard, hopping patterns can be discerned based on the difference in bandwidth as described supra. For example, if a device has lower bandwidth capability than that utilized by other network components for communication, hopping can take place within a single frequency block reserved for control channels rather than across multiple frequency blocks. Further, logical grouping 1202 can comprise an electrical component for interpreting control data from a signal transmitted by the device based at least in part on the determined hopping pattern 1208. Therefore, the control data can be analyzed for utilization thereof for example, to allocate additional resources to a utilized communications channel, etc. Additionally, system 1200 can include a memory 1210 that retains instructions for executing functions associated with electrical components 1204, 1206, and 1208. While shown as being external to memory 1210, it is to be understood that electrical components 1204, 1206, and 1208 can exist within memory 1210.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method for transmitting control data in a wireless communications network, comprising:
   generating control data for a first device;
   mapping the control data to a portion of bandwidth reserved for control data based on a hopping pattern, the hopping pattern is a function of available bandwidth of the wireless communications network and of the first device, wherein the hopping pattern for the control data includes hopping within the portion of the bandwidth to which the control data was mapped if the available bandwidth of the wireless communication network is greater than the available bandwidth of the first device, and wherein the hopping pattern for the control data includes hopping from the portion of the bandwidth to which the control data was mapped to a disparate portion of the bandwidth if the available bandwidth supported by the first device is greater than or substantially equal to the available bandwidth of the wireless communications network; and
   transmitting the mapped control data to a second device according to the hopping pattern.

2. The method of claim 1, where the portion of bandwidth is at a first edge of the system bandwidth.

3. The method of claim 2, where the first portion of bandwidth is one of two edges of the bandwidth pre-assigned for transmitting control data.

4. The method of claim 3, the two edges of bandwidth are of disparate size.

5. The method of claim 1, the first device is a mobile device and the second device is a base station.

6. The method of claim 1, the control data comprises acknowledgement (ACK) and/or channel quality (CQI) information.

7. The method of claim 1, further comprising inferring the hopping pattern based on the available bandwidth of the wireless communications network and of the first device.

8. A wireless communications apparatus, comprising:
   at least one processor configured to map control data for a device in a wireless communications network to symbols of bandwidth, having a plurality of frequency blocks reserved for control data, based at least in part on a hopping pattern, the hopping pattern includes hopping frequencies within one of the plurality of frequency blocks over a time period and wherein the hopping pattern is a function of available bandwidth of the wireless communications network and of the device, wherein the hopping pattern for the control data includes hopping within a portion of the bandwidth to which the control data was mapped if the available bandwidth of the wireless communications network is greater than the available bandwidth of the device, and wherein the hopping pattern for the control data includes hopping from the portion of the bandwidth to which the control data was mapped to a disparate portion of the bandwidth if the available bandwidth of the device is greater than or substantially equal to the available bandwidth of the wireless communications network; and
   a memory coupled to the at least one processor.

9. The wireless communications apparatus of claim 8, where the frequency blocks reserved for control data are at each edge of the system bandwidth.

10. The wireless communications apparatus of claim 9, where the frequency blocks are substantially the same size.

11. The wireless communications apparatus of claim 9, wherein the hoping pattern includes hopping from one frequency block reserved for control data at the edge of the frequency to the other.

12. The wireless communications apparatus of claim 8, the at least one processor further configured to transmit the mapped control data according to the hopping pattern.

13. The wireless communications apparatus of claim 8, the control data comprises acknowledgement (ACK) and/or channel quality (CQI) information.

14. The wireless communications apparatus of claim 8, the at least one processor further configured to infer the hopping pattern based on the available bandwidth of the wireless communications apparatus and of a utilized communications channel.

15. A wireless communications apparatus that transmits control data according to a hopping pattern, comprising:
   means for mapping control data for a device in a wireless communications network to one of a plurality of portions of available frequency pre-assigned for use with control data; and
   means for hopping according to a hopping pattern, wherein the hopping pattern includes hopping within the portion of available frequency to map additional control data to provide frequency diversity, and wherein the hopping pattern is a function of available bandwidth of the wireless communications network and of the device, wherein the hopping pattern for the control data includes hopping within a portion of a bandwidth to which the control data was mapped if the available bandwidth of the wireless communications network is greater than the available bandwidth of the device, and wherein the hopping pattern for the control data includes hopping from the portion of the bandwidth to which the control data was mapped to a disparate portion of the bandwidth if the available bandwidth of the device is greater than or substantially equal to the available bandwidth of the wireless communications network.

16. The wireless communications apparatus of claim 15, further comprising means for communicating where the plurality of portions of available frequency pre-assigned for use with control data exist at the edges of associated bandwidth.

17. The wireless communications apparatus of claim 16, further comprising:
means for hopping from one edge of the bandwidth to the other to achieve frequency diversity.

18. The wireless communications apparatus of claim 16, the sizes of the portions of available frequency are substantially equal.

19. The wireless communications apparatus of claim 15, further comprising means for transmitting the mapped control data.

20. The wireless communications apparatus of claim 15, the control data comprises acknowledgement (ACK) and/or channel quality (CQI) information.

21. A computer program product, comprising:
a non-transitory computer-readable medium comprising:
code for causing at least one computer to generate control data for a first device;
code for causing the at least one computer to map the control data to a portion of bandwidth reserved for control data based on a hopping pattern, the hopping pattern is a function of available bandwidth of the wireless communications network and of the first device, wherein the hopping pattern for the control data includes hopping within the portion of the bandwidth to which the control data was mapped if the available bandwidth of the wireless communications network is greater than the available bandwidth of the first device, and wherein the hopping pattern for the control data includes hopping from the portion of the bandwidth to which the control data was mapped to a disparate portion of the bandwidth if the available bandwidth of the first device is greater than or substantially equal to the available bandwidth of the wireless communications network; and
code for causing the at least one computer to transmit the mapped control data to a second device according to the hopping pattern.

22. A wireless communication apparatus, comprising:
a processor configured to:
map control data for a device in a wireless communications network to one of a plurality of portions of available frequency pre-assigned for use with control data; and
hop according to a hopping pattern, wherein the hopping pattern includes hopping within the portion of available frequency to map additional control data to provide frequency diversity, and wherein the hopping pattern is a function of available bandwidth of the wireless communications network and of the device, wherein the hopping pattern for the control data includes hopping within a portion of a bandwidth to which the control data was mapped if the available bandwidth of the wireless communication network is greater than the available bandwidth of the device, and wherein the hopping pattern for the control data includes hopping from the portion of the bandwidth to which the control data was mapped to a disparate portion of the bandwidth if the available bandwidth of the device is greater than or substantially equal to the available bandwidth of the wireless communications network; and
a memory coupled to the processor.

23. A method for determining control data from devices utilizing different hopping patterns, comprising:
receiving a signal having a plurality of frequency blocks reserved for communicating control data;
determining a control data hopping pattern for at least one device in a wireless communications network based at least in part on bandwidth capabilities of the device, wherein the hopping pattern is a function of available bandwidth of the wireless communications network and of the at least one device, wherein the hopping pattern for the control data includes hopping within a portion of a bandwidth to which the control data was mapped if the available bandwidth of the wireless communication network is greater than the available bandwidth of the at least one device, and wherein the hopping pattern for the control data includes hopping from the portion of the bandwidth to which the control data was mapped to a disparate portion of the bandwidth if the available bandwidth of the at least one device is greater than or substantially equal to the available bandwidth of the wireless communications network; and
decoding the control data according to the determined hopping pattern.

24. The method of claim 23, the hopping pattern includes at least one of hopping across the plurality frequency blocks or hopping within one of the plurality of frequency blocks for given time periods.

25. The method of claim 24, the hopping within one of the plurality of frequency blocks is chosen for the hopping pattern for devices lacking bandwidth capability to hop across the plurality of frequency blocks.

26. The method of claim 23, further comprising grouping devices transmitting control data by bandwidth capabilities, each group hops within a disparate frequency block of the plurality of frequency blocks.

27. The method of claim 26, the disparate frequency blocks are sized according to the actual number of devices within the group or a predicted number of devices within the group.

28. The method of claim 23, the signal has the frequency blocks dedicated to control data positioned at each edge of the signal.

29. A wireless communications apparatus, comprising:
at least one processor configured to receive control data from a plurality of devices in a wireless communication network on a signal having reserved frequency blocks for transmitting control data, the control data utilizes one of a plurality of hopping patterns based on device bandwidth capabilities, and wherein the hopping pattern for each device is a function of available bandwidth of the wireless communications network and of the device, wherein the hopping pattern for the control data includes hopping within a portion of a bandwidth to which the control data was mapped if the available bandwidth of the wireless communication network is greater than the available bandwidth of the device, and wherein the hopping pattern for the control data includes hopping from the portion of the bandwidth to which the control data was mapped to a disparate portion of the bandwidth if the available bandwidth of the device is greater than or substantially equal to the available bandwidth of the wireless communications network; and
a memory coupled to the at least one processor.

30. The wireless communications apparatus of claim 29, the at least one processor further configured to interpret the control data from the signal based at least in part on the hopping pattern.

31. The wireless communications apparatus of claim 29, the hopping pattern includes at least one of hopping across the reserved frequency blocks or hopping within one of the reserved frequency blocks for given time periods.

32. The wireless communications apparatus of claim 31, the hopping within one of the reserved frequency blocks is utilized as the hopping pattern for devices lacking bandwidth capability to hop across the reserved frequency blocks.

33. The wireless communications apparatus of claim 29, the at least one processor further configured to group the devices by bandwidth capabilities, each group utilizes a hopping pattern that hops within a disparate frequency block of the reserved frequency blocks.

34. The wireless communications apparatus of claim 33, the reserved frequency blocks are sized according to the actual number of devices within the respective group or a predicted number of devices within the respective group.

35. The wireless communications apparatus of claim 29, the signal has the reserved frequency blocks dedicated to control data positioned at each edge of the signal.

36. A wireless communications apparatus for interpreting control data utilizing various hopping patterns, comprising:
    means for receiving bandwidth capability information regarding a device in a wireless communication network;
    means for determining a hopping pattern utilized by a device transmitting control data based at least in part on the bandwidth capability information, wherein the hopping pattern is a function of available bandwidth of the wireless communications network and of the device, wherein the hopping pattern for the control data includes hopping within a portion of a bandwidth to which the control data was mapped if the available bandwidth of the wireless communications network is greater than the available bandwidth of the device, and wherein the hopping pattern for the control data includes hopping from the portion of the bandwidth to which the control data was mapped to a disparate portion of the bandwidth if the available bandwidth of the device is greater than or substantially equal to the available bandwidth of the wireless communications network; and
    means for interpreting control data from a signal transmitted by the device based at least in part on the determined hopping pattern.

37. The wireless communications apparatus of claim 36, the hopping pattern includes at least one of hopping across a plurality frequency blocks of the signal reserved for communicating control data or hopping within one of the plurality of frequency blocks in given time periods.

38. The wireless communications apparatus of claim 37, the hopping within one of the plurality of frequency blocks is chosen for the hopping pattern for devices having lower bandwidth capability than that utilized by the wireless communications apparatus.

39. The wireless communications apparatus of claim 37, further comprising means for grouping the device with one or more devices transmitting control data by the bandwidth capability information, the group hops within a disparate frequency block of the plurality of frequency blocks than other groups of devices.

40. The wireless communications apparatus of claim 39, the disparate frequency blocks are sized according to the actual number of devices within a respective group or a predicted number of devices within a respective group.

41. The wireless communications apparatus of claim 36, the signal has frequency blocks dedicated to control data positioned at each edge of the signal.

42. A computer program product, comprising:
    a non-transitory computer-readable medium comprising:
        code for causing at least one computer to receive a signal having a plurality of frequency blocks reserved for communicating control data;
        code for causing the at least one computer to determine a control data hopping pattern for at least one device in a wireless communication network based at least in part on bandwidth capabilities of the device, wherein the hopping pattern is a function of available bandwidth of the wireless communications network and of the at least one device, wherein the hopping pattern for the control data includes hopping within a portion of a bandwidth to which the control data was mapped if the available bandwidth of the wireless communications network is greater than the available bandwidth of the at least one device, and wherein the hopping pattern for the control data includes hopping from the portion of the bandwidth to which the control data was mapped to a disparate portion of the bandwidth if the available bandwidth of the at least one device is greater than or substantially equal to the available bandwidth of the wireless communications network; and
        code for causing the at least one computer to decode the control data according to the determined hopping pattern.

43. The computer program product of claim 42, the hopping pattern includes at least one of hopping across the plurality frequency blocks or hopping within one of the plurality of frequency blocks for given time periods.

44. A wireless communication apparatus, comprising:
    a processor configured to:
        receive bandwidth capability information regarding a device in a wireless communications network;
        determine a hopping pattern utilized by a device transmitting control data based at least in part on the bandwidth capability information, wherein the hopping pattern is a function of available bandwidth of the wireless communications network and of the device, wherein the hopping pattern for the control data includes hopping within a portion of a bandwidth to which the control data was mapped if the available bandwidth of the wireless communications network is greater than the available bandwidth of the device, and wherein the hopping pattern for the control data includes hopping from the portion of the bandwidth to which the control data was mapped to a disparate portion of the bandwidth if the available bandwidth of the device is greater than or substantially equal to the available bandwidth of the wireless communications network; and
        interpret control data from a signal transmitted by the device based at least in part on the determined hopping pattern; and
    a memory coupled to the processor.

* * * * *